United States Patent
Yokoi

(10) Patent No.: US 10,539,418 B2
(45) Date of Patent: Jan. 21, 2020

(54) TARGET DETECTION APPARATUS AND METHOD

(71) Applicant: DENSO CORPORATION, Kariya, Aichi-pref. (JP)

(72) Inventor: Yusuke Yokoi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 137 days.

(21) Appl. No.: 15/913,304

(22) Filed: Mar. 6, 2018

(65) Prior Publication Data
US 2018/0259329 A1 Sep. 13, 2018

(30) Foreign Application Priority Data
Mar. 8, 2017 (JP) ................. 2017-044244

(51) Int. Cl.
G01C 3/08 (2006.01)
G06T 7/20 (2017.01)
G01S 13/86 (2006.01)
G01S 13/93 (2006.01)

(52) U.S. Cl.
CPC .......... G01C 3/08 (2013.01); G06T 7/20 (2013.01); G01S 13/867 (2013.01); G01S 13/931 (2013.01); G06T 2207/30261 (2013.01)

(58) Field of Classification Search
CPC ... G01C 3/08; G06T 7/20; G06T 2207/30261; G01S 13/867; G01S 13/931
See application file for complete search history.

(56) References Cited

U.S. PATENT DOCUMENTS

| 2014/0297171 | A1 | 10/2014 | Minemura et al. |
| 2014/0333467 | A1* | 11/2014 | Inomata ............... G01S 13/867 342/27 |
| 2017/0120904 | A1* | 5/2017 | Kentley ............... G01C 21/32 |
| 2019/0271777 | A1* | 9/2019 | Hiromitsu ........... G01S 13/931 |

FOREIGN PATENT DOCUMENTS

| JP | 2014-197325 A | 10/2014 |
| JP | 2016-197278 A | 11/2016 |

* cited by examiner

Primary Examiner — Aaron L Troost
(74) Attorney, Agent, or Firm — Knobbe, Martens, Olson & Bear, LLP

(57) ABSTRACT

In a target detection apparatus mounted in a vehicle, a target detector is configured to detect a target present in a forward direction of the vehicle based on image information acquired from an imager to capture images of a scene ahead of the vehicle. A position-of-collision calculator is configured to calculate an expected position of collision at which the target is expected to collide with the vehicle in the future based on a position of the target relative to the vehicle. A first determiner is configured to, based on the expected position of collision calculated by the position-of-collision calculator, determine whether or not a situation exists where a determination as to whether or not the target is a traversing target that is a target moving in a direction transverse to a forward direction of the vehicle can be made based on an optical flow of the target.

9 Claims, 5 Drawing Sheets

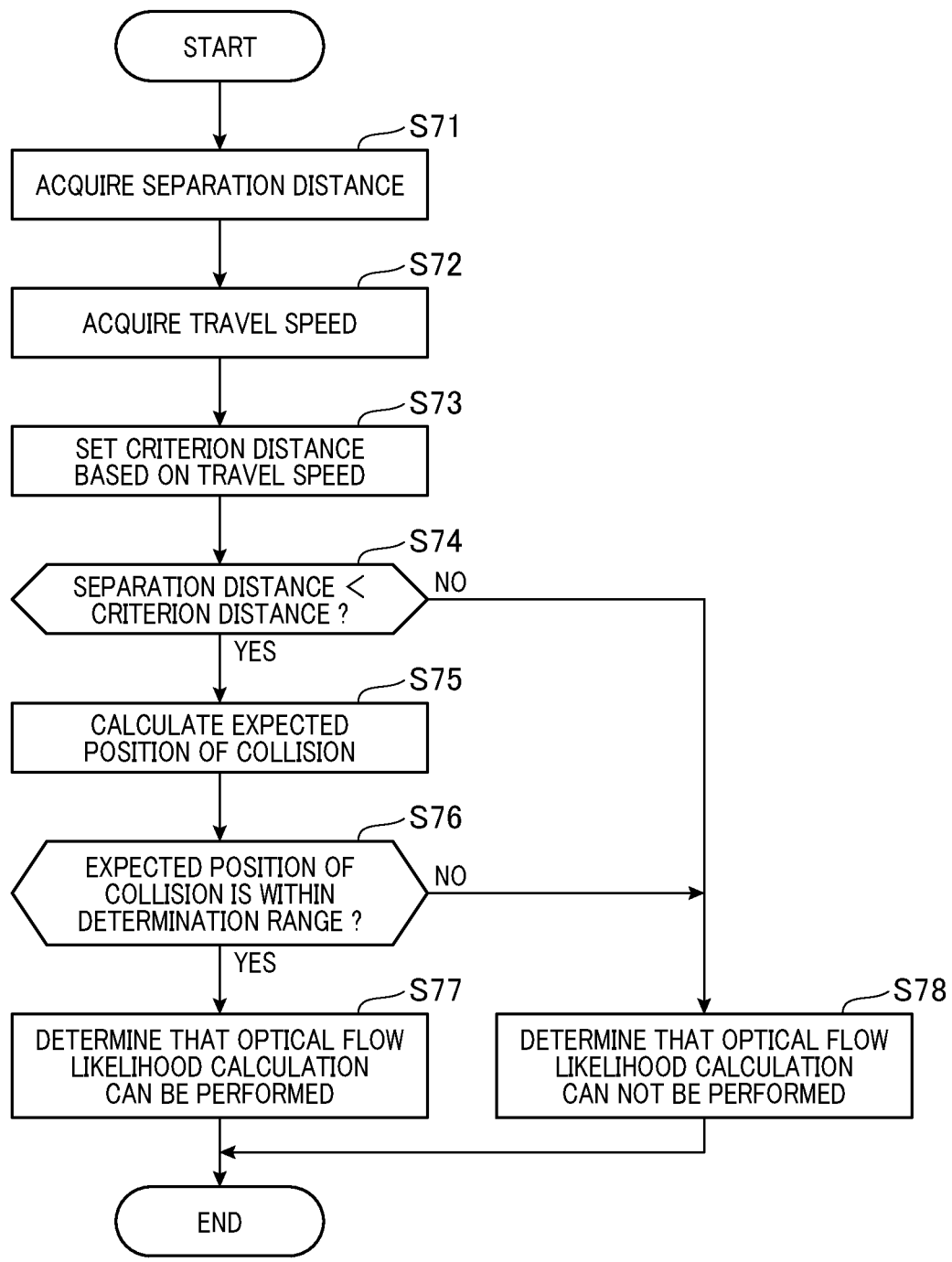

TARGET DETECTION APPARATUS AND METHOD

CROSS-REFERENCE TO RELATED APPLICATION

This application is based on and claims the benefit of priority from earlier Japanese Patent Application No. 2017-44244 filed Mar. 8, 2017, the description of which is incorporated herein by reference.

BACKGROUND

Technical Field

The present disclosure relates to a target detection apparatus and method.

Related Art

A known apparatus as disclosed in, for example, Japanese Patent Application Laid-Open Publication No. 2016-197278, detects one of a plurality of targets recognized from an image that has a same or similar distance/azimuth from an own vehicle as a target detected by a millimeter-wave radar as the same target. This apparatus determines whether or not the same target detected is a pedestrian moving in a direction transverse to a forward direction of the own vehicle, which is hereinafter referred to as a traversing pedestrian, based on parameters representing a likelihood that the target is a traversing pedestrian. Such parameters include an optical flow likelihood. For an optical flow of a feature point of the same target indicating transverse movement on the image, the optical flow likelihood is set high. A higher optical flow likelihood indicates a higher likelihood that the target is a pedestrian moving in a direction transverse to a forward direction of the own vehicle.

Even if there is no actual change in transverse position of a target relative to the own vehicle, the transverse position of the target relative to the own vehicle will move away from the own vehicle on the image as a distance between the target and the own vehicle decreases. In such a situation where the distance between the target and the own vehicle is decreasing, an amount of movement per unit of time of the transverse position of the target relative to the own vehicle on the image, which is hereinafter referred to as an amount of receding movement per unit of time, will increase as the transverse position of the target relative to the own vehicle is further away from the own vehicle. Thus, in a situation where the distance between the target and the own vehicle is decreasing, if a target moves in a direction transverse to a forward direction of the own vehicle, an amount of movement of the target in the transverse direction per unit of time on the image, which is hereinafter referred to as an amount of transverse movement per unit of time, will tend to be underestimated due to cancellation of the amount of receding movement per unit of time. In such a case, it is difficult to accurately determine whether or not the target is a traversing pedestrian based on the optical flow of the target. Thus, the apparatus disclosed in Japanese Patent Application Laid-Open Publication No. 2016-197278 has to set a lower degree of contribution of the optical flow likelihood to determination as to whether or not the target is a traversing pedestrian as compared with the other parameters.

In view of the foregoing, it is desired to have an apparatus capable of more accurately determining whether or not a situation exists where an accurate determination as to whether or not the target is a traversing target can be made based on an optical flow of the target.

SUMMARY

In accordance with an exemplary embodiment of the present disclosure, there is provided a target detection apparatus mounted in a vehicle, including a target detector, a position-of-collision calculator, and a first determiner. The target detector is configured to detect a target present in a forward direction of the vehicle based on image information acquired from an imager configured to capture images of a scene ahead of the vehicle. The position-of-collision calculator is configured to calculate an expected position of collision at which the target is expected to collide with the vehicle in the future based on a position of the target relative to the vehicle. The first determiner is configured to, based on the expected position of collision calculated by the position-of-collision calculator, determine whether or not a situation exists where a determination as to whether or not the target is a traversing target that is a target moving in a direction transverse to a forward direction of the vehicle can be made based on an optical flow of the target.

Even if there is no actual change in transverse position of a target relative to the vehicle, the transverse position of the target relative to the vehicle will move away from the vehicle on the image as a separation distance between the target and the vehicle decreases. In such a situation where the distance between the target and the vehicle is decreasing, an amount of movement per unit of time of the transverse position of the target relative to the vehicle on the image, referred to as an amount of receding movement per unit of time, will increase as the transverse position of the target relative to the vehicle is further away from the vehicle. This phenomenon may raise concern about occurrence of a situation where the determination accuracy can not be ensured in determining whether or not the target is a traversing target that is a target moving in a direction transverse to a forward direction of the vehicle based on an optical flow of the target.

For example, it may be assumed that a target is moving in a direction transverse to a forward direction of the vehicle and an expected position of collision of the target calculated based on the position of the target is on a side of the widthwise center of the vehicle including the target. Under such assumption, the transverse position of the target at a time when the expected position of collision is calculated may be much further away from the vehicle as compared to the case where the expected position of collision is on the opposite side of the widthwise center of the vehicle from the target. In such a situation, an amount of movement of the target in the transverse direction per unit of time on the image, that is, an amount of transverse movement per unit of time, may be much underestimated due to cancelation of the amount of receding movement per unit of time. In a situation with a small amount of transverse movement per unit of time of the target on the image, an accurate determination as to whether or not the target is the traversing target can not be made based on the optical flow of the target.

To address such an issue, the target detection apparatus includes the first determiner to determine whether or not a situation exists where a determination as to whether or not the target is the traversing target can be made based on the expected position of collision of the target. With this configuration, it can be determined whether or not a situation exists where an accurate determination as to whether or not the target is the traversing target can be made based on the optical flow of the target.

BRIEF DESCRIPTION OF THE DRAWINGS

FIG. 8 is a flowchart of situation determination processing.

DESCRIPTION OF SPECIFIC EMBODIMENTS

Figure 1:
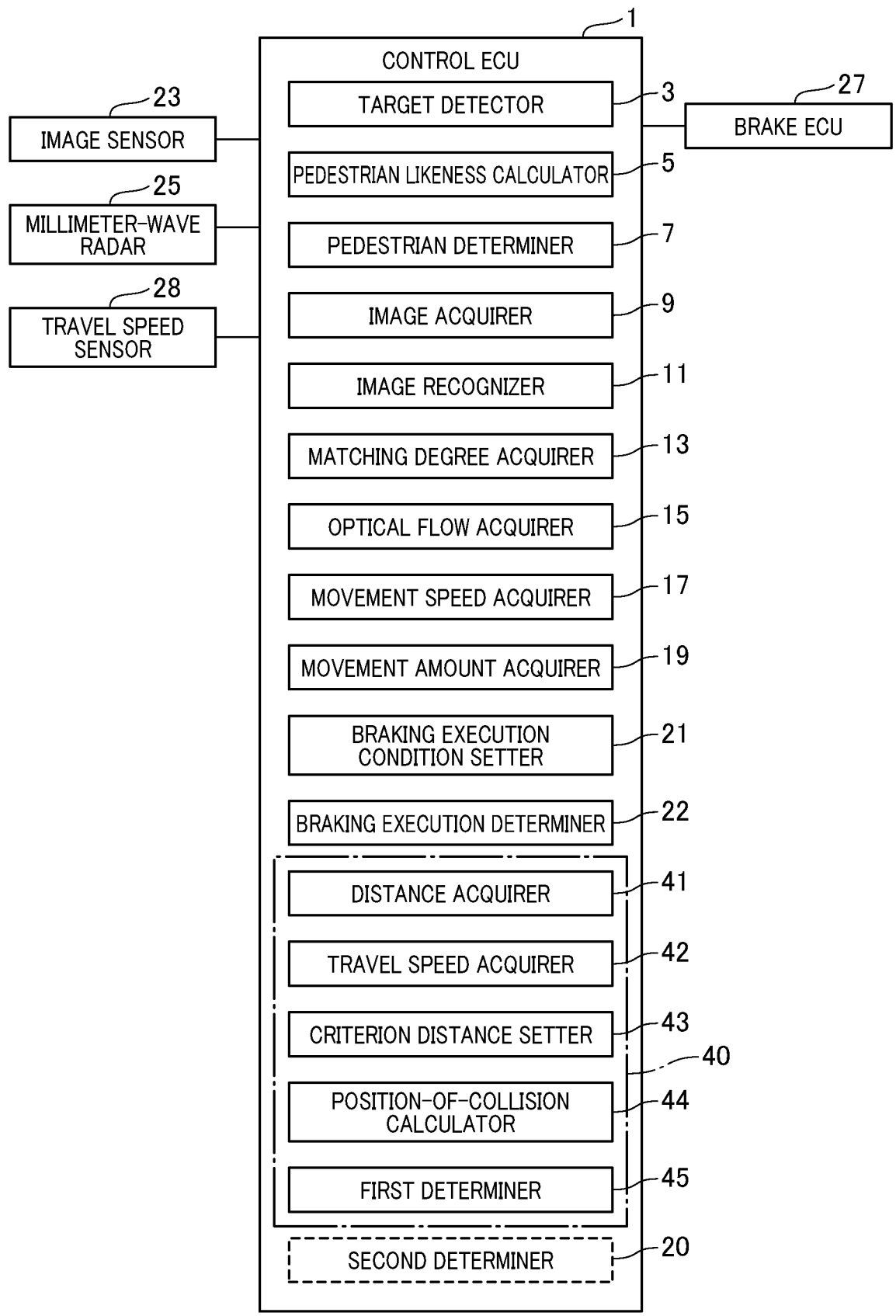
FIG. 1 is a block diagram of a control ECU in accordance with one embodiment of the present disclosure.
Figure 2:
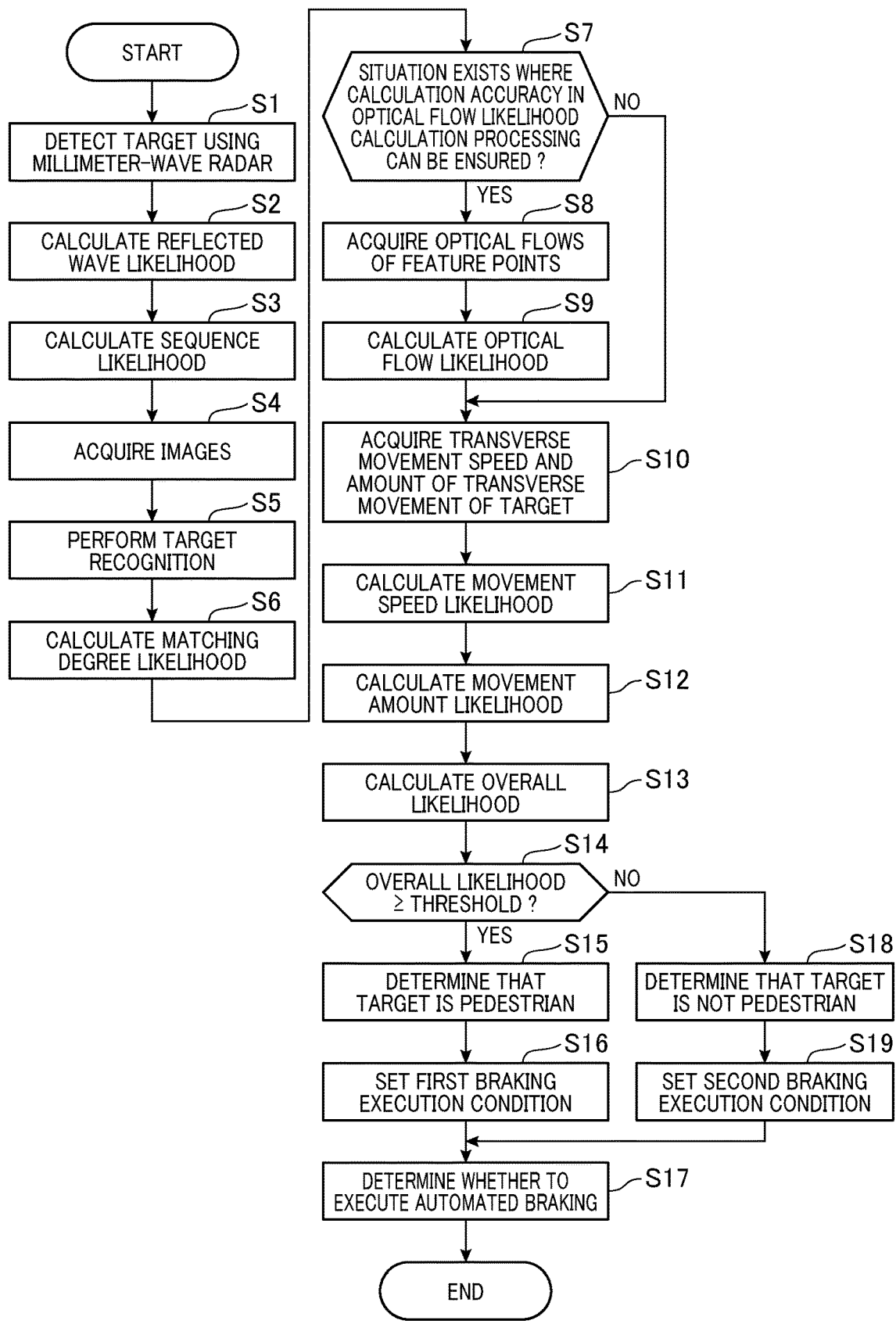
FIG. 2 is a flowchart of processing performed by the control ECU.

Hereinafter, exemplary embodiments of the present disclosure will be described in detail with reference to the accompanying drawings, in which like reference numerals refer to like or similar elements regardless of reference numerals and duplicated description thereof will be omitted.

A control electronic control unit (ECU) 1 and its related configuration will now be described with reference to FIG. 1. The control ECU 1 is an example of a pedestrian determination apparatus. The control ECU 1 is mounted in a vehicle. In the following, the vehicle carrying the control ECU 1 is referred to as an own vehicle. The control ECU 1 may be configured as a well-known computer including a central processing unit (CPU), a read-only memory (ROM), a random-access memory (RAM), and other components. The control ECU 1 performs processing described later through the CPU executing computer programs stored in the ROM.

The control ECU 1 includes, as functional blocks, a target detector 3, a pedestrian likeness calculator 5, a pedestrian determiner 7, an image acquirer 9, an image recognizer 11, a matching degree acquirer 13, a situation determiner 40, an optical flow acquirer 15, a movement speed acquirer 17, a movement amount acquirer 19, a braking execution condition setter 21, and a braking execution determiner 22. Functions of these blocks will be described later.

Besides the control ECU 1, the own vehicle includes an image sensor 23, a millimeter-wave radar 25, a brake ECU 27, and a travel speed sensor 28.

The image sensor 23 (as an imager) is configured to acquire images of the scene ahead of the own vehicle (i.e., the scene in the forward direction of the own vehicle) every predetermined time interval to generate image data. The millimeter-wave radar 25 is configured to transmit and receive frequency-modulated radar waves in a millimeter wave band to detect a target ahead of the own vehicle, such as a vehicle, a pedestrian, a roadside object, or an obstacle. The millimeter-wave radar 25 may be configured to acquire a separation distance between the own vehicle and the target, an azimuth of the target with respect to the own vehicle, and a relative speed of the target with respect to the own vehicle.

The travel speed sensor 28 is configured to detect a travel speed (or vehicle speed) of the own vehicle.

The brake ECU 27 may be configured as a well-known computer including a central processing unit (CPU), a read-only memory (ROM), a random-access memory (RAM), and other components. Various processing described later may be performed by the CPU executing computer programs stored in the ROM. As described later, upon receipt of a processor executable instruction from the control ECU 1, the brake ECU 27 executes automatic braking.

Processing repeatedly performed by the control ECU 1 every predetermined time interval will now be described with reference to FIGS. 2-5. At step S1 of FIG. 2, the target detector 3 detects a target ahead of the own vehicle using the millimeter-wave radar 25, and detects a separation distance between the own vehicle and the target, an azimuth of the target with respect to the own vehicle, and a relative speed of the target with respect to the own vehicle.

At step S2, based on the reflected waves, the pedestrian likeness calculator 5 calculates a likelihood that the target detected at step S1 is a pedestrian in the following manner. Such a likelihood is hereinafter referred to as a reflected wave likelihood.

The pedestrian likeness calculator 5 acquires the strength of the reflected waves (radar waves transmitted by millimeter-wave radar 25 and then reflected by the target) as detected at step S1 and the magnitude of fluctuations in the reflected waves (the degree to which the strength of the reflected waves varies over time).

The pedestrian likeness calculator 5 has a map prestored to output the reflected wave likelihood as a function of the strength of the reflected waves and the magnitude of fluctuations in the reflected waves. Upon receipt of the strength of the reflected waves and the magnitude of fluctuations in the reflected waves, the pedestrian likeness calculator 5 calculates the reflected wave likelihood using this map.

When the strength of the reflected waves is equal to or less than a predetermined threshold, the reflected wave likelihood calculated as above is higher than would otherwise be the case. In addition, when the magnitude of fluctuations in the reflected waves is equal to or greater than a predetermined threshold, the reflected wave likelihood calculated as above is higher than would otherwise be the case.

The reflected wave likelihood is a parameter representing a likelihood that the target is a pedestrian moving in a direction transverse to a forward direction of the own vehicle. The reflected wave likelihood takes a positive value. A higher value of the reflected wave likelihood corresponds to a higher likelihood that the target is a pedestrian moving in a direction transverse to a forward direction of the own vehicle.

At step S3, the pedestrian likeness calculator 5 calculates a sequence likelihood for the target detected at step S1.

Figure 3:
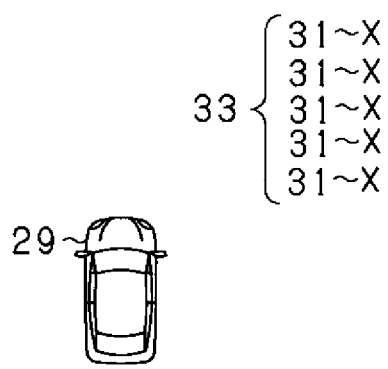
FIG. 3 is an example of a sequence of targets.

When a sequence of targets located at intervals are detected at step S1, the pedestrian likeness calculator 5 determines whether or not a target for which the sequence likelihood is to be calculated belongs to the sequence of targets. FIG. 3 illustrates an example of the sequence of targets. In this example, a sequence of targets 33 located at intervals are present ahead of the own vehicle 29. The sequence of targets 33 may be, for example, a sequence of poles arranged at intervals along a roadway.

If the target for which sequence likelihood is to be calculated belongs to the sequence of targets, the pedestrian likeness calculator 5 sets the sequence likelihood to a value A1. If the target for which the sequence likelihood is to be calculated does not belong to the sequence of targets, the pedestrian likeness calculator 5 sets the sequence likelihood to a value A2. The values A1 and A2 are different constants such that 0<A2<A1.

The sequence likelihood is a parameter representing a likelihood that the target is a pedestrian moving in a direction transverse to a forward direction of the own vehicle. The sequence likelihood takes a positive value. A higher value of the sequence likelihood corresponds to a higher likelihood that the target is a pedestrian moving in a direction transverse to a forward direction of the own vehicle.

At step S4, the image acquirer 9 acquires images of a scene in front of the own vehicle using the image sensor 23.

At step S5, the image recognizer 11 (as a target detector) recognizes targets in each image acquired at step S4 using a well-known image-recognition technique. A target recognition is performed by matching with dictionaries prepared for various target types. The dictionaries may be, but are not limited to, a pedestrian dictionary, a vehicle dictionary, or a roadside object dictionary.

At step S6, the matching degree acquirer 13 and the pedestrian likeness calculator 5 calculate a matching degree likelihood for the target detected at step S1 in the following manner.

The matching degree acquirer 13 identifies one of the targets recognized at step S5 as the target detected at step S1. Such a target recognized at step S5 that can be identified as being identical to the target detected at step S1 is hereinafter referred to as an identical target. The matching degree acquirer 13 may be configured to determine one of the targets recognized at step S5 that has a same or similar distance/azimuth from the own vehicle as the target detected at step S1 as an identical target. The matching degree acquirer 13 then acquires a degree of matching between the identical target and the pedestrian dictionary. The degree of matching between the identical target and the pedestrian dictionary indicates how well they match. A higher degree of matching corresponds to a larger number of features common between the identical target and the dictionary.

Subsequently, the pedestrian likeness calculator 5 calculates a matching degree likelihood from the degree of matching acquired as above. That is, the pedestrian likeness calculator 5 has a map prestored to output the matching degree likelihood as a function of the degree of matching. Upon receipt of the degree of matching acquired as above, the pedestrian likeness calculator 5 calculates the matching degree likelihood with reference to the map. A higher degree of matching corresponds to a higher value of the matching degree likelihood calculated in this manner.

The matching degree likelihood is a parameter representing a likelihood that the target is a pedestrian moving in a direction transverse to a forward direction of the own vehicle. The matching degree likelihood takes a positive value. A higher value of the matching degree likelihood corresponds to a higher likelihood that the target is a pedestrian moving in a direction transverse to a forward direction of the own vehicle.

At step S7, the situation determiner 40 determines whether or not a situation exists that the accuracy can be ensured in calculating a likelihood that the identical target is a pedestrian moving in a direction transverse to a forward direction of the own vehicle based on an optical flow of the target. Such a likelihood is hereafter referred to as an optical flow likelihood. A determination as to whether or not a situation exists that the calculation accuracy in optical flow likelihood calculation (corresponding to steps S8 and S9 described later) can be ensured will be described later. If a situation does not exist that the calculation accuracy in optical flow likelihood calculation can be ensured ("NO" branch of step S7), the process flow proceeds to step S10. If a situation exists that the calculation accuracy in optical flow likelihood calculation can be ensured ("YES" branch of step S7), the process flow proceeds to step S8.

At step S8, the optical flow acquirer 15 sets feature points in the identical target on each image acquired at step S4 and acquires optical flows of the feature points (representing apparent motion on the image). The optical flows can be acquired by tracking the respective feature points on a plurality of images acquired with a time difference between the images. Each feature point may be an edge of the target on the image that is a portion of the target where a difference in brightness value between adjacent pixels of the image is equal to or greater than a predetermined value.

Figure 4:
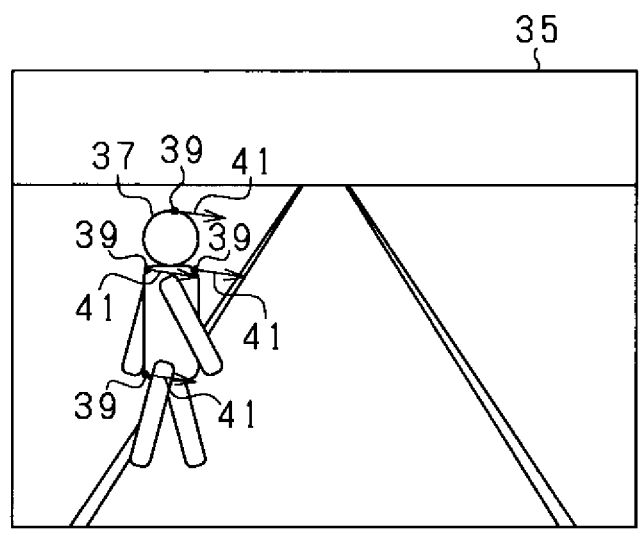
FIG. 4 is an illustration of acquiring optical flows.

FIG. 4 illustrates an example of acquiring the optical flows. In this example, an identical target (e.g., a pedestrian) 37 is recognized in the image 35. Optical flows 41 of feature points 39 of the identical target 37 are acquired.

At step S9, the pedestrian likeness calculator 5 calculates the optical flow likelihood for the target detected at step S1 in the following manner.

The pedestrian likeness calculator 5 determines whether or not the optical flows acquired at step S8 indicate transverse movement of the target on the image. If it is determined that the optical flows indicate transverse movement of the target on the image, the pedestrian likeness calculator 5 sets the optical flow likelihood for the target detected at step S1 to a value B1. If it is not determined that the optical flows indicate transverse movement of the target on the image, the pedestrian likeness calculator 5 sets the optical flow likelihood for the target detected at step S1 to a value B2. The values B1 and B2 are different constants such that 0<B2<B1.

The optical flow likelihood is a parameter representing a likelihood that the target is a pedestrian moving in a direction transverse to a forward direction of the own vehicle. The optical flow likelihood takes a positive value. A higher value of the optical flow likelihood corresponds to a higher likelihood that the target is a pedestrian moving in a direction transverse to a forward direction of the own vehicle.

At step S10, the movement speed acquirer 17 acquires a speed of transverse movement of the target detected at step S1. The movement amount acquirer 19 acquires an amount of transverse movement of the target detected at step S1.

Figure 5:
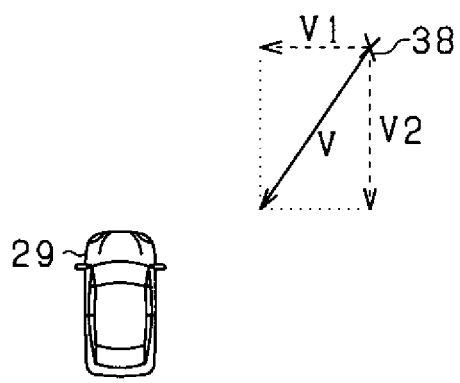
FIG. 5 is an example of a speed of transverse movement of a target.

The speed and the amount of transverse movement of the target detected at step S1 will now be described with reference to FIG. 5, where a relative speed of the target 38 is denoted by V. A speed of transverse movement V1 is a vehicle-widthwise component of the relative speed V of the own vehicle 29. The amount of transverse movement is an integral quantity of the speed of transverse movement V1 over a predetermine time interval.

The movement speed acquirer 17 can acquire the speed and the amount of transverse movement of the target from a detection result of the millimeter-wave radar 25. The movement speed acquirer 17 may acquire a speed and an amount of transverse movement of the target is identified as being identical to the target detected at step S1 from a plurality of images acquired by the image sensor 23.

At step S11, the pedestrian likeness calculator 5 calculates a movement speed likelihood for the target detected at step S1.

The pedestrian likeness calculator 5 determines whether or not the speed of transverse movement acquired at step S10 is within a predetermined speed range. This speed range is defined to include a typical speed of a pedestrian moving in a direction transverse to a forward direction of the own vehicle.

If it is determined that the speed of transverse movement is within the predetermined speed range, the pedestrian likeness calculator 5 sets the movement speed likelihood for the target detected at step S1 to a value C1. If it is determined that the speed of transverse movement is outside the predetermined speed range, the pedestrian likeness calculator 5 sets the movement speed likelihood for the target detected at step S1 to a value C2. The values C1 and C2 are different constants such that $0<C2<C1$.

The movement speed likelihood is a parameter representing a likelihood that the target is a pedestrian moving in a direction transverse to a forward direction of the own vehicle. The movement speed likelihood takes a positive value. A higher value of the movement speed likelihood corresponds to a higher likelihood that the target is a pedestrian moving in a direction transverse to a forward direction of the own vehicle.

At step S12, the pedestrian likeness calculator 5 calculates a movement amount likelihood for the target detected at step S1 in the following manner.

The pedestrian likeness calculator 5 determines whether or not the amount of transverse movement acquired at step S10 is within a predetermined movement amount range. This range is defined to include a typical amount of transverse movement of a pedestrian moving in a direction transverse to a forward direction of the own vehicle.

If it is determined that the amount of transverse movement is within the predetermined movement amount range, the pedestrian likeness calculator 5 sets the movement amount likelihood for the target detected at step S1 to a value D1. If it is determined that the amount of transverse movement is not within the predetermined movement amount range, the pedestrian likeness calculator 5 sets the movement amount likelihood for the target detected at step S1 to a value D2. The values D1 and D2 are different constants such that $0<D2<D1$.

The movement amount likelihood is a parameter representing a likelihood that the target is a pedestrian moving in a direction transverse to a forward direction of the own vehicle. The movement amount likelihood takes a positive value. A higher value of the movement amount likelihood corresponds to a higher likelihood that the target is a pedestrian moving in a direction transverse to a forward direction of the own vehicle.

At step S13, the pedestrian likeness calculator 5 calculates a product of the reflected wave likelihood calculated at step S2, the sequence likelihood calculated at step S3, the matching degree likelihood calculated at step S6, the optical flow likelihood calculated at step S9, the movement speed likelihood calculated at step S11, and the movement amount likelihood calculated at step S12, thereby calculating an overall likelihood that the target is a pedestrian moving in a direction transverse to a forward direction of the own vehicle.

When the strength of the reflected waves from the target detected by the millimeter-wave radar 25 is equal to or less than the predetermined threshold, the overall likelihood calculated as above is higher than would otherwise be the case. In addition, when the magnitude of fluctuations in the reflected waves is equal to or greater than the predetermined threshold, the overall likelihood calculated as above is higher than would otherwise be the case.

If the target belongs to the sequence of targets, the overall likelihood is less than would otherwise be the case. A higher degree of matching of the identical target corresponds to a higher value of the overall likelihood. If the optical flows of the feature points of the identical target indicates movement in the transverse direction on the image, the overall likelihood is greater than would otherwise be the case. If the speed of transverse movement of the target is within the predetermined speed range, the overall likelihood is greater than would otherwise be the case. If the amount of transverse movement of the target is within the predetermined movement amount range, the overall likelihood is greater than would otherwise be the case.

At step S14, the pedestrian determiner 7 determines whether or not the overall likelihood calculated at step S13 is equal to or greater than a predetermined threshold. If it is determined that the overall likelihood is equal to or greater than the predetermined threshold, the process flow proceeds to step S15 ("YES" branch of step S14).

At step S15, the pedestrian determiner 7 determines that the target detected at step S1 is a pedestrian moving in a direction transverse to a forward direction of the own vehicle.

At step S16, the braking execution condition setter 21 sets a first braking execution condition. The first braking execution condition is a condition such that, if it is met by the target detected at step S1, an instruction for executing automated braking is outputted to the brake ECU 27. The first braking execution condition may be a condition for a time until collision (TTC), a separation distance between the own vehicle and the target, an azimuth of the target with respect to the own vehicle or the like. The first braking execution condition is a suitable condition for the case of the target being a pedestrian moving in a direction transverse to a forward direction of the own vehicle. For example, the first braking execution condition may be more difficult to meet than a second braking execution condition described later.

At step S17, the braking execution condition setter 21 determines whether or not the target detected at step S1 meets the braking execution condition (more specifically, the first braking execution condition at step S16 or the second braking execution condition at step S19). If the braking execution condition is met, the braking execution condition setter 21 outputs the instruction for executing automated braking to the brake ECU. Otherwise, the process flow ends.

If it is determined that the overall likelihood is less than the predetermined threshold ("NO" branch of step S14), the process flow proceeds to step S18. At step S18, the pedestrian determiner 7 determines that the target detected at step S1 is not a pedestrian moving in a direction transverse to a forward direction of the own vehicle.

At step S19, the braking execution condition setter 21 sets the second braking execution condition. The second braking execution condition is a condition such that, if it is met by the target detected at step S1, the instruction for executing automated braking is outputted to the brake ECU 27. The second braking execution condition may be a condition for a time until collision (TTC), a separation distance between the own vehicle and the target, an azimuth of the target with respect to the own vehicle or the like. The second braking execution condition is a suitable condition for the case of the target being not a pedestrian moving in a direction transverse to a forward direction of the own vehicle, for example, for the case of the target being another vehicle.

In cases where a plurality of targets are detected at step S1, steps S2-S17 are performed for each target.

Figure 6:
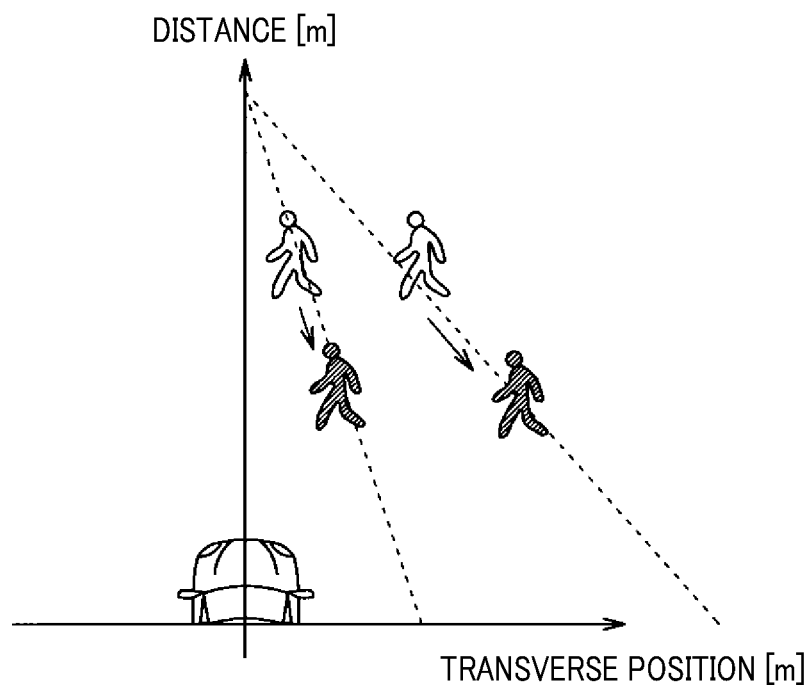
FIG. 6 is an example of a situation where a transverse position of a target relative to an own vehicle moves away from the own vehicle on an image as the target approaches the own vehicle.

As shown in FIG. 6, even if there is no actual change in transverse position of a target relative to the own vehicle, the transverse position of the target relative to the own vehicle will move away from the own vehicle on the image as a separation distance between the target and the own vehicle decreases. In such a situation where the distance between the target and the own vehicle is decreasing, an amount of movement per unit of time of the transverse position of the target relative to the own vehicle on the image, that is, an amount of receding movement per unit of time, will increase as the transverse position of the target relative to the own vehicle is further away from the own vehicle. This phenomenon may raise concern about occurrence of a situation where the calculation accuracy in calculating the optical flow likelihood can not be ensured.

Figure 7:
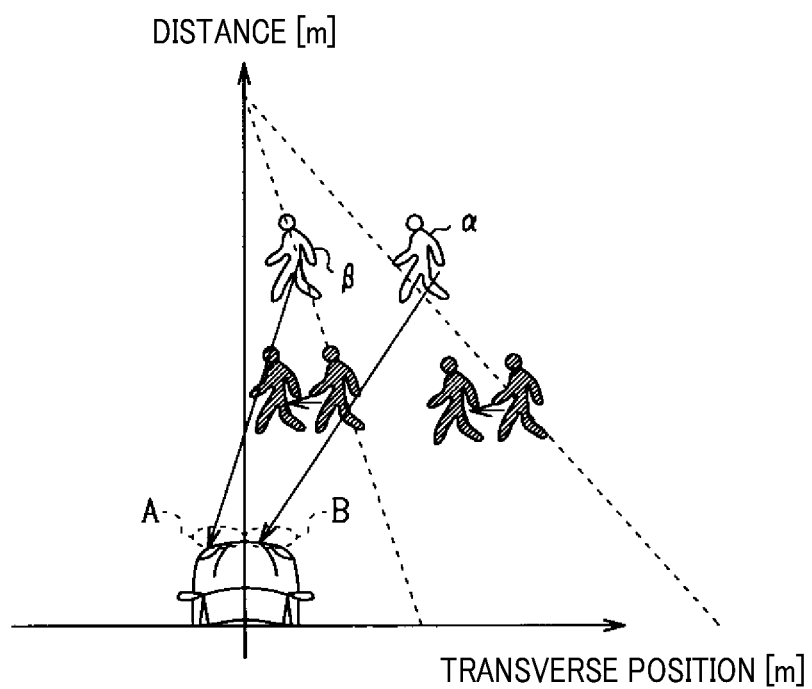
FIG. 7 is an example of a situation where the calculation accuracy in optical flow likelihood calculation processing can not be ensured.

For example, it may be assumed that a target is moving in a direction transverse to a forward direction of the own vehicle and an expected position of collision of the target at which the target (or an object including the target) is expected to collide with the own vehicle in the future is on a side of the widthwise center of the vehicle including the target (as indicated by a positional relationship α in FIG. 7). Under such assumption, the transverse position of the target at a time when the expected position of collision is calculated may be much further away from the own vehicle as compared to the case where the expected position of collision is on the opposite side of the widthwise center of the vehicle from the target (as indicated by a positional relationship 3 in FIG. 7). In such a situation, an amount of movement of the target in the transverse direction per unit of time on the image, hereinafter referred to as an amount of transverse movement per unit of time, may be much underestimated due to cancelation of the amount of receding movement per unit of time.

In addition, an amount of decrease per unit of time in the separation distance between the own vehicle and the target increases as the travel speed of the own vehicle increases. An amount of receding movement per unit of time of the target on the image increases as the amount of decrease per unit of time in the separation distance between the own vehicle and the target increases. Therefore, in a situation where the own vehicle is traveling at a high speed and the separation distance between the own vehicle and the target is decreasing, even if the target is moving in a direction transverse to a forward direction of the own vehicle, the target on the image may appear to move away from the own vehicle due to cancellation of a large amount of receding movement per unit of time of the target on the image.

As above, in a situation where an amount of transverse movement per unit of time of the target on the image is underestimated, the calculation accuracy in calculating the optical flow likelihood can not be ensured. Therefore, to address such an issue, the situation determiner 40 included in the control ECU determines whether or not a situation exists where the calculation accuracy in calculating the optical flow likelihood can be ensured (see step S7 in FIG. 2). The situation determiner 40 includes a distance acquirer 41, a travel speed acquirer 42, a criterion distance setter 43, a position-of-collision calculator 44, and a first determiner 45. Functions of these blocks will be described later.

Situation determination processing performed to determine whether or not a situation exists where the calculation accuracy in calculating the optical flow likelihood can be ensured will now be described with reference to FIG. 8. This situation determination processing is a subroutine corresponding to step 7 shown in FIG. 2.

At step S71, the distance acquirer 41 acquires a separation distance between the own vehicle and the target from the millimeter-wave radar 25. At step S72, the travel speed acquirer 42 acquires a travel speed of the own vehicle detected by the travel speed sensor 28. At step S73, the criterion distance setter 43 sets a criterion distance based on the travel speed of the own vehicle.

The criterion distance is a threshold set to determine whether or not the separation distance between the own vehicle and the target is an appropriate distance to perform the optical flow likelihood calculation. If the own vehicle is traveling at a high speed and the criterion distance is set to a short distance, the optical flow likelihood calculation may be performed with a short separation distance between the own vehicle and the target despite the own vehicle traveling at a high speed. In the case of the target being a traversing target, this may raise concern about occurrence of a situation where a collision of the target with the own vehicle can not be avoided in time even if the control ECU 1 outputs the instruction for executing automated braking to the brake ECU 27 and automated braking is thereby initiated. Therefore, the criterion distance is set to a distance increasing with increasing travel speed of the own vehicle. However, if the travel speed of the own vehicle is too high, an amount of receding movement per unit of time of the target will increase, which may lead to a low calculation accuracy in optical flow likelihood calculation. If the travel speed of the own vehicle is too low and the movement speed of the target is low, it is expected that an amount of transverse movement per unit of time of the target on the image will be underestimated. In this case, a determination can not be made as whether or not the target is a traversing target based on the optical flow of the target.

In view of the foregoing, if the travel speed of the own vehicle is within a second predetermined range, the criterion distance is increased with increasing travel speed. If the travel speed of the own vehicle is outside the second predetermined range, that is, if the travel speed of the own vehicle is too high or too low, the criterion distance is set to zero.

At step S74, the first determiner 45 determines whether or not separation distance between the own vehicle and the target is less than the criterion distance. If it is determined that the separation distance between the own vehicle and the target is less than the criterion distance ("YES" branch of step S74), then the process flow proceeds to step S75.

At step S75, the position-of-collision calculator 44 calculates an expected position of collision based on a position of the target detected by the millimeter-wave radar 25. A well-known method may be used to calculate the expected position of collision. At step S76, the first determiner 45 determines whether or not the expected position of collision calculated by the position-of-collision calculator 44 is within a predetermined determination range A (see FIG. 7).

A target, an expected position of collision of which is within a width of the own vehicle, is likely to collide with the own vehicle in the future. Therefore, the determination range A is set to a vehicle width. This allows a determination as to whether or not the target that is likely to collide with the own vehicle in the future is a traversing target to be made. It may be assumed that the expected position of collision of the target is positioned around a widthwise edge of the own vehicle on a side of the widthwise center of the own vehicle on which the target is present (as indicated by a positional relationship α in FIG. 7). In such a case, the transverse position of the target at a time when the expected position of collision is calculated may be much further away from the own vehicle, which leads to a situation where an amount of transverse movement per unit of time of the target on the image may be underestimated. Such a situation is inappropriate to calculate the optical flow of the target. Therefore, the determination range A is set to a width of the own vehicle minus a first predefined range B. The first predefined range B extends from the widthwise center of the own vehicle to the edge of the own vehicle on the side of the widthwise center on which the target is present. That is, the determination range A extends from the widthwise center to the edge of the own vehicle on the opposite side of the widthwise center of the own vehicle.

If it is determined that the expected position of collision is within the predetermined determination range A ("YES" branch of step S76), the process flow proceeds to step S77. At step S77, the first determiner 45 determines that a situation exists where the optical flow likelihood calculation can be performed. Then, this determination processing ends.

If at step S74 it is determined that the separation distance between the own vehicle and the target is equal to or greater than the criterion distance ("NO" branch of step S74) or if at step S76 it is determined that the expected position of collision is outside the determination range A ("NO" branch of step S76), the process flow proceeds to step S78. At step S78, the first determiner 45 determines that a situation does not exist where the optical flow likelihood calculation can be performed. Then, this determination processing ends.

The present embodiment described above can provide the following advantages.

(A1) It is determined based on the expected position of collision and the travel speed of the own vehicle whether or not a situation exists where a determination as to whether or not the target is a traversing target can be made from the optical flow of the target. With this configuration, it can be determined whether or not a situation exists where an accurate determination as to whether or not the target is a traversing target can be made based on the optical flow of the target. Such a determination as to whether or not the target is a traversing target, based on the optical flow of the target, is hereinafter referred to an optical flow based determination.

(A2) The determination range A is set to a width of the own vehicle minus the first predefined range B. The first predefined range B extends from the widthwise center of the own vehicle to the edge of the own vehicle on the side of the widthwise center including the target. With this configuration, it is possible to determine for which one of targets that are likely to collide with the own vehicle in the future the optical flow based determination can be made. In addition, a target moving away from the own vehicle is less likely to collide with the own vehicle. Therefore, making the determination at step S76 allows the target moving away from the own vehicle to be removed from optical flow based determination considerations. That is, for the target moving away from the own vehicle, the optical flow based determination is not made.

(A3) If the travel speed of the own vehicle is within the second predetermined range, the criterion distance is increased with increasing travel speed. If the travel speed of the own vehicle is outside the second predetermined range, the criterion distance is set to zero. With this configuration, it is possible to set an appropriate criterion distance in response to the travel speed of the own vehicle.

(A4) Performing the optical flow likelihood calculation on a condition that it is determined that a situation exists where the optical flow likelihood calculation can be performed can prevent reduction in the calculation accuracy.

Modifications

There will now be described some modifications that may be devised without departing from the spirit and scope of the present invention.

(M1) In the embodiment, the expected position of collision of a target is calculated based on a position of the target detected by the millimeter-wave radar 25. In an alternative, the expected position of collision may be calculated based on a position of the target acquired based on image data captured by the image sensor 23.

(M2) In the embodiment, the separation distance used in determination step S74 of FIG. 8 is acquired by the millimeter-wave radar 25. In an alternative, the separation distance may be acquired based on image data captured by the image sensor 23.

(M3) In the above embodiment, in the optical flow likelihood calculation processing performed if it is determined in the situation determination processing that a situation exists where the calculation accuracy in calculating the optical flow likelihood can be ensured (i.e., if the answer is "YES" at step S7 of FIG. 7), a likelihood that the target is a pedestrian moving in a direction transverse to a forward direction of the own vehicle, that is an optical flow likelihood, is calculated. In an alternative, the optical flow likelihood may be a likelihood that the target is another vehicle moving in a direction transverse to a forward direction of the own vehicle. In such an embodiment, in optical flow likelihood calculation processing performed if it is determined in situation determination processing that a situation exists where the calculation accuracy in calculating the optical flow likelihood can be ensured, a likelihood that the target is another vehicle moving in a direction transverse to a forward direction of the own vehicle is calculated. In still another alternative, the control ECU 1 may include a second determiner 20, instead of including the pedestrian likeness calculator 5, the pedestrian determiner 7, the image recognizer 11, the matching degree acquirer 13, the movement speed acquirer 17, and the movement amount acquirer 19. In such an embodiment, the second determiner 20 determines, based on the optical flow acquired by the optical flow acquirer 15, whether or not the target is a traversing target that is a target moving in a direction transverse to a forward direction of the own vehicle. Such determination processing is referred to as second determination processing.

(M4) In the embodiment, if the travel speed of the own vehicle is outside the second predetermined range, the criterion distance is set to zero. In an alternative, the criterion distance may be increased with increasing travel speed.

(M5) In the embodiment, it is determined based on the expected position of collision and the travel speed of the own vehicle whether or not a situation exists where a determination as to whether or not the target is a traversing target can be made from the optical flow of the target. In an alternative, it may be determined based on the expected position of collision whether or not a situation exists where a determination as to whether or not the target is a traversing target can be made from the optical flow of the target.

(M6) In the embodiment, the determination range A is set to a width of the own vehicle minus the first predefined range B. In an alternative, the determination range A may be set to an extended range minus the first predefined range B. The extended range extends from the edge of the own vehicle on the side of the widthwise center on which the target is present to beyond the opposite edge of the own vehicle on the opposite side of the widthwise center from the target.

What is claimed is:

1. A target detection apparatus mounted in a vehicle, comprising:
a target detector configured to detect a target present in a forward direction of the vehicle based on image information acquired from an imager configured to capture images of a scene ahead of the vehicle;
a position-of-collision calculator configured to calculate an expected position of collision at which the target is expected to collide with the vehicle in the future based on a position of the target relative to the vehicle;
a first determiner configured to, based on the expected position of collision calculated by the position-of-collision calculator, determine whether or not a situation exists where a determination as to whether or not the target is a traversing target that is a target moving in a direction transverse to a forward direction of the vehicle can be made based on an optical flow of the target.

2. The apparatus according to claim 1, wherein the first determiner is configured to, if the expected position of collision of the target calculated by the position-of-collision calculator is within a determination range (A) that is set in a widthwise direction of the vehicle, determine that a situation exists where a determination as to whether or not the target is the traversing target can be made based on an optical flow of the target.

3. The apparatus according to claim 2, wherein the determination range (A) is set to a width of the vehicle minus a first predefined range (B) that is part of the width of the vehicle including an edge of the vehicle on a widthwise side including the target.

4. The apparatus according to claim 2, wherein the determination range (A) is set to a range extending in the widthwise direction from an edge of the vehicle on a widthwise side including the target to beyond the opposite edge of the vehicle minus a first predefined range (B) that is part of a width of the vehicle including the edge of the vehicle on the widthwise side including the target.

5. The apparatus according to claim 1, further comprising a travel speed acquirer configured to acquire a travel speed of the vehicle,
wherein the first determiner is configured to, based on the travel speed of the vehicle acquired by the travel speed acquirer and the expected position of collision of the target calculated by the expected position of collision calculator, determine whether or not a situation exists where a determination as to whether or not the target is the traversing target can be made based on an optical flow of the target.

6. The apparatus according to claim 5, further comprising:
a distance acquirer configured to acquire a distance between the vehicle and the target detected by the target detector; and
a criterion distance setter configured to set a criterion distance based on the travel speed acquired by the travel speed acquirer,
wherein the first determiner is configured to, if determining that the distance acquired by the distance acquirer is less than the criterion distance set by the criterion distance setter, determine that a situation exists where a determination as to whether or not the target is the traversing target can be made based on an optical flow of the target.

7. The apparatus according to claim 6, wherein the criterion distance setter is configured to, if the travel speed acquired by the travel speed acquirer is within a second predetermined range, increase the criterion distance with increasing travel speed, and if the travel speed acquired by the travel speed acquirer is outside the second predetermined range, set the criterion distance to zero.

8. The apparatus according to claim 1, further comprising a second determiner configured to, on a condition that it is determined by the first determiner that a situation exists where a determination as to whether or not the target is the traversing target can be made based on an optical flow of the target, determine whether or not the target is the traversing target based on the optical flow of the target.

9. A target detection method comprising:
detecting a target present in a forward direction of a vehicle based on image information acquired from an imager configured to capture images of a scene ahead of the vehicle;
calculating an expected position of collision at which the target is expected to collide with the vehicle in the future based on a position of the target relative to the vehicle;
determining, based on the expected position of collision calculated, whether or not a situation exists where a determination as to whether or not the target is a traversing target that is a target moving in a direction transverse to a forward direction of the vehicle can be made based on an optical flow of the target.

* * * * *